United States Patent

Kurashima et al.

[11] Patent Number: 5,844,585
[45] Date of Patent: Dec. 1, 1998

[54] APPARATUS AND METHOD FOR PRINTING HIGH-QUALITY COLOR IMAGE AT HIGH SPEED

[75] Inventors: Norihiko Kurashima; Kazumichi Shimada, both of Nagano, Japan

[73] Assignee: Seiko Epson Corporation, Tokyo, Japan

[21] Appl. No.: 635,402

[22] Filed: Apr. 26, 1996

[30] Foreign Application Priority Data

Apr. 27, 1995 [JP] Japan ..................................... 7-104014
Jan. 26, 1996 [JP] Japan ..................................... 8-012112

[51] Int. Cl.$^6$ ............................... B41J 2/145; B41J 2/21; B41J 29/38
[52] U.S. Cl. .................................... 347/43; 347/40; 347/9
[58] Field of Search ................................. 347/41, 43, 40, 347/12, 9

[56] References Cited

U.S. PATENT DOCUMENTS

| 4,198,642 | 4/1980 | Gamblin ..................................... 346/75 |
| 4,272,771 | 6/1981 | Furukawa ..................................... 347/12 |
| 4,920,355 | 4/1990 | Katerberg ..................................... 347/41 |
| 5,059,984 | 10/1991 | Moore et al. ............................... 347/41 |

FOREIGN PATENT DOCUMENTS

| 53-2040 | 1/1978 | Japan ............................. G06K 15/00 |
| 3-207665 | 9/1991 | Japan ................................. B41J 2/21 |
| 4-19030 | 3/1992 | Japan ................................. B41J 2/21 |

*Primary Examiner*—Peter S. Wong
*Assistant Examiner*—Bao Q. Vu
*Attorney, Agent, or Firm*—Sughrue, Mion, Zinn, Macpeak & Seas, PLLC

[57] ABSTRACT

A color ink jet printer having high throughput and a high-quality printing capability is disclosed. Nozzle arrays for spouting black ink, cyan ink, magenta ink, and yellow ink are placed on a print head. Each of the nozzle arrays has N nozzles arranged in a vertical scanning direction at intervals of k times the dot pitch of a print image. The nozzles are driven at intermittent timing during the horizontal scanning of the print head for forming dots at intervals of s times the dot pitch. At the termination of the horizontal scanning, vertical scanning is executed by a given distance. The vertical scanning distance L is set so as to satisfy the following expression:

$$L = N/(s \cdot D \cdot k)$$

wherein s is an arbitrary integer greater than one and less than N, and a submultiple of N, k is an arbitrary integer greater than one and less than N having prime relation with N/s, and D is the number of nozzles existing per unit distance in the vertical scanning direction.

14 Claims, 8 Drawing Sheets

APPARATUS AND METHOD FOR PRINTING HIGH-QUALITY COLOR IMAGE AT HIGH SPEED

BACKGROUND OF THE INVENTION

1. Field of the Invention

This invention relates to serial scanning and drum scanning printers for printing while a print head is scanning the print media surface and in particular, to system improvements in head drive and scan intended for print image enhancement and throughput improvement.

2. Description of the Related Art

An innovation called an "interlace system" is disclosed in U.S. Pat. No. 4,198,642, Japanese Patent Publication No. Sho. 53-2040, etc., as one of techniques for image enhancement in printers of the aforementioned type, particularly in ink jet printers. This interlace system features the ink jet nozzle array structure on a print head and the vertical scanning method. That is, the nozzle array consists of N nozzles arranged in the vertical scanning direction, the center point spacing of contiguous nozzles (nozzle pitch) is set to k times pixel pitch D of a print image, and N and k are selected as integers having prime relation therebetween. The distance of vertical scanning executed after each horizontal scanning is set to N·D.

The interlace system produces the effect of enhancing the print quality by dispersing variations in nozzle pitches, ink spout characteristics, etc., on a print image.

Another technique intended for image quality improvement in color ink jet printers is an art called "shingling" or "multiscan" disclosed in Japanese Patent Publication No. Hei. 3-207665, Japanese Patent Publication No. Hei. 4-19030, etc. The shingling uses a print head comprising a plurality of nozzle arrays for jetting ink of different colors arranged in parallel in the horizontal scanning direction. The shingling drives all the nozzle arrays of different colors at intermittent timing in one horizontal scanning for forming dots every given number of dots in the horizontal scanning direction and forming dots of all colors at different positions by each nozzle array in one horizontal direction. Such horizontal scanning is repeated more than once by shifting the nozzle drive timing at each time, thereby completing formation of all dots on the line continuous in the horizontal scanning direction.

In the shingling, ink dots of different colors are not formed overlapping at the same position in a single horizontal scanning, thus solving a so-called ink bleeding problem in which ink dots of different colors are integrated with each other for degrading the image quality.

To provide high image quality in a color printer, it is requisite to prevent degradation of the image quality by variations in nozzle pitches, spout characteristic, etc., and to prevent ink bleeding of dots of different colors. Hitherto, the interlace system has been known to meet the former requirement and the shingling has been known to meet the latter requirement.

However, if the conventional interlace system and the conventional shingling are combined simply, the following problems occur:

The first problem lies in that throughput is powered. That is, to reliably prevent ink bleeding, it is desired to suppress formation of dots of different colors in a single horizontal scanning at not only the same dot positions, but also contiguous dot positions. However, if an attempt is made to accomplish it by the conventional shingling, printing at all dot positions must be completed by repeating horizontal scanning four times or more. Thus, even if a bidirectional print method for printing on both forward and return directions of horizontal scanning is adopted, it is necessary to repeat forward and back operation twice or more; if the bidirectional printing is not adopted, the forward and back operation must be repeated four times or more. As a result, the printing speed is lowered, reducing throughput.

The second problem lies in that scanning control becomes complicated.

That is, if a forward and back operation (hereafter go and return) of horizontal scanning is repeated twice or more to reliably prevent the ink bleeding as described above, vertical scanning is not executed during the go and return and upon completion of the repetitions, vertical scanning is executed. As a result, a simple scanning system for executing horizontal scanning and vertical scanning alternately cannot be adopted and scanning control becomes complicated. Such a scanning system can also cause band-like unevenness to occur on a print image.

Further, the third problem lies in that a drum scanning printer cannot be adopted. That is, the drum scanning printer adopts a scanning system for running a print head at a given speed while rotating a drum at a given speed, thereby providing high throughput and high image quality. This scanning system is the same as the system for simply executing horizontal scanning and vertical scanning alternately from the viewpoint of the relative relationship between the head and media. The drum scanning printer cannot execute bidirectional printing because of adaptation of the above-mentioned scanning system.

From these circumstances, the drum scanning printer cannot adopt the conventional shingling, because if an attempt is made to execute the shingling under conditions where bidirectional printing is impossible, it is inevitable to repeat horizontal scanning more than once between the horizontal scanning and vertical scanning. This means that the system for simply repeating horizontal scanning and vertical scanning alternately cannot be adopted and that the scanning system of the drum scanning printer is not compatible with the shingling.

SUMMARY OF THE INVENTION

It is therefore an object of the invention to provide a printer which can enhance a print image and improve throughput under a scanning system for simply executing horizontal scanning and vertical scanning alternately.

The apparatus and printing method according to the invention use a print head having a dot formation element array comprising N dot formation elements for forming dots of a single color (for example, ink jet nozzles) arranged at constant pitches in a vertical scanning direction and executes horizontal scanning and vertical scanning of the print head alternately. The dot formation element array of the print head is driven for either or both of the go way and return way of the horizontal scanning for forming dots on a print medium. The vertical scanning is always executed by a predetermined distance.

Here, the distance of one vertical scanning is defined as a vertical scanning pitch L, the number of horizontal scanning repetitions required for printing a line continuous in a horizontal scanning direction as the number of scan repetitions s, a value representing a distance between center points of the dot formation elements by a multiple of a dot pitch of a print image as an element pitch k, and the number of the dot formation elements existing per unit distance in the dot formation element array as an element density D.

In the printer and printing method of the invention, an arbitrary integer between more than one and less than N is selected as the number of scan repetitions s, an arbitrary integer between more than one and less than N and which is not commensurable with N/s is selected as the element pitch k, and a value satisfying a relational expression of L=N/(s·D·k) is selected as the vertical scanning pitch L.

According to the invention, if the dot formation element array is driven at intermittent timing during the horizontal scanning, dots spaced from each other in both horizontal and vertical scanning directions are formed by a single dot formation element, namely, contiguous dots are formed by different dot formation elements. As a result, variations in the dot formation characteristics of the nozzles, etc., are dispersed in both the horizontal and vertical scanning directions, enhancing the print image quality.

One preferred form of driving at the intermittent timing is to drive the dot formation element array at the intermittent timing corresponding to dots at intervals of (s−1) dots. In more general expression, the preferred form is to drive the dot formation element array so that different dots in a dot matrix having s dots in the horizontal scanning direction and k dots in the vertical scanning direction are formed by repeating the horizontal scanning s×k successive times.

In the printer and printing method of the invention, the horizontal scanning direction distance between dots formed by a single dot formation element (in terms of the number of dot pitches) can be defined in proportion to the number of scan repetitions s and the image resolution and the vertical scanning direction distance (in terms of the number of dot pitches) can be defined in proportion to the nozzle pitch k. Therefore, the greater the number of scan repetitions s and the nozzle pitch k, the more improved are the image resolution and quality. Then, if a plurality of print modes are provided and a different value for each print mode is selected as the number of scan repetitions s or the nozzle pitch k, the user can select appropriate resolution and image quality according to the application.

When a plurality of print modes are thus provided, the throughput is degraded as the number of scan repetitions s and the nozzle pitch k increase. Then, if the horizontal scanning speed is increased as the number of scan repetitions s increases, a reduction in the throughput caused by the increase in the number of scan repetitions s can be suppressed.

The number of repetitions s and the nozzle pitch k can be set as properly large values for preventing dots of different colors from being formed not only at the same position, but also at contiguous positions in the same horizontal scanning for color printing, thereby extremely well preventing ink bleeding, enhancing the image quality all the more.

The preferred embodiment of the invention comprises four dot formation element arrays for forming dots of four colors black, cyan, magenta, and yellow and drives the four dot formation element arrays at different timings so as to form dots of different colors at different dot positions during one horizontal scanning, whereby ink bleeding when color printing is executed can be prevented. In this case, high throughput can be obtained as compared with the case where an attempt is made to bring about a similar bleed prevention effect by executing the conventional shingling.

Further, in the embodiment, both the number of scan repetitions s and the nozzle pitch k are set to even numbers, whereby if bidirectional printing is executed, one line in the horizontal scanning direction is always printed only on either the go or return way of the horizontal scanning, so that degradation in the throughput in bidirectional printing is largely suppressed.

The invention can also be applied for representing one pixel by a plurality of dots to represent multiple tone images. In this case, one pixel is represented by a dot matrix consisting of s dots in the horizontal scanning direction×k dots in the vertical scanning direction and printing of one pixel can be completed by executing horizontal scanning s×k times. As a result, different dots in one pixel are formed by different dot formation elements, thus variations in the dot formation characteristics of the dot formation elements can be absorbed, enhancing the image quality.

DETAILED DESCRIPTION OF THE PREFERRED EMBODIMENTS

Figure 1:
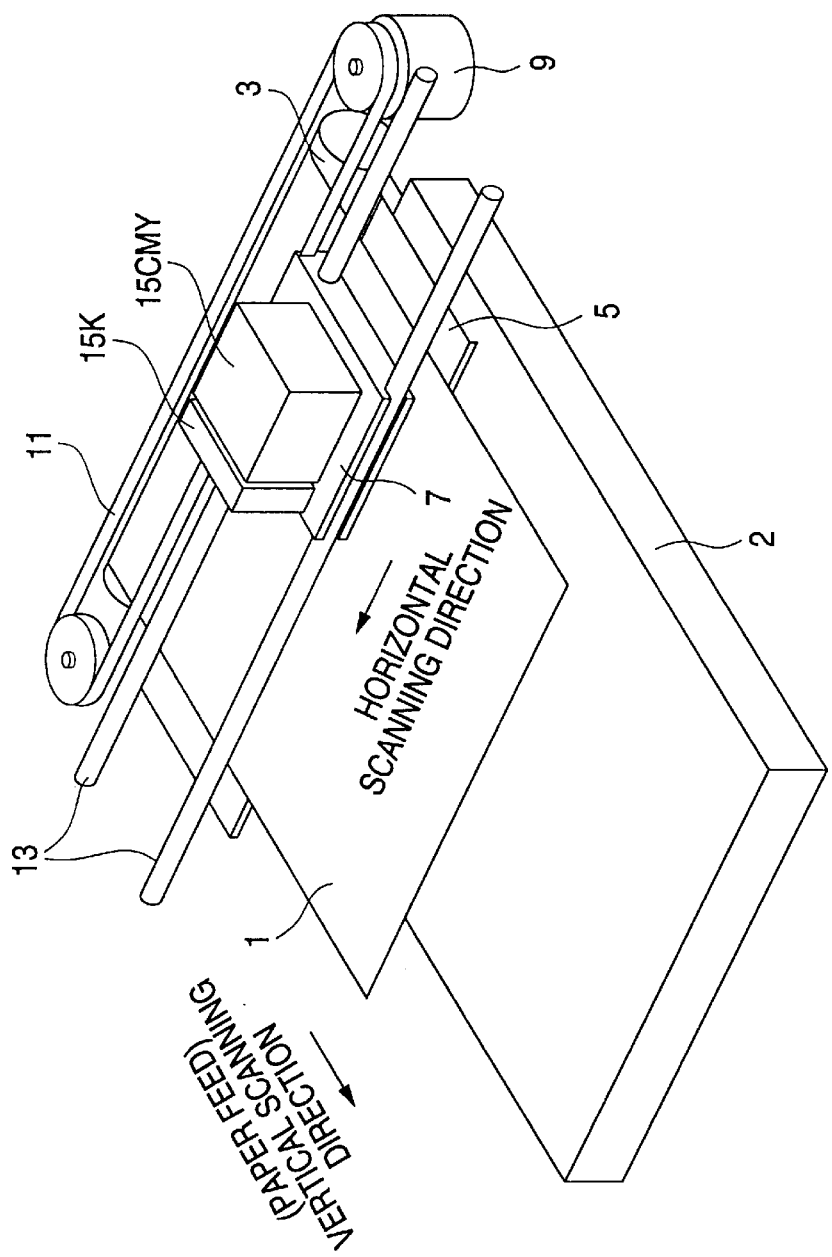
FIG. 1 shows the machine configuration of main parts of a color ink jet printer of serial scanning type according to one embodiment of the invention.

FIG. 1 shows the machine configuration of main parts of a color ink jet printer of serial scanning type according to one embodiment of the invention.

As shown in FIG. 1, print paper 1 is wound by a paper feed roller 3 driven by a step motor from a paper stacker 2 and is fed in the vertical scanning direction on the surface of a platen board 5. A carriage 7 is pulled by a pulling belt 11 driven by step motor 9 and is moved along guide rails 13 in the horizontal scanning direction perpendicular to the vertical scanning direction.

A print head 15K having black (K) ink and a print head 15CMY having color ink of three colors cyan (C), magenta (M), and yellow (Y) are mounted on the carriage 7. The print heads 15K and 15CMY are arranged in the horizontal scanning direction as a whole. The color ink print head 15CMY may be separated into three print heads for each color of ink.

Figure 2:
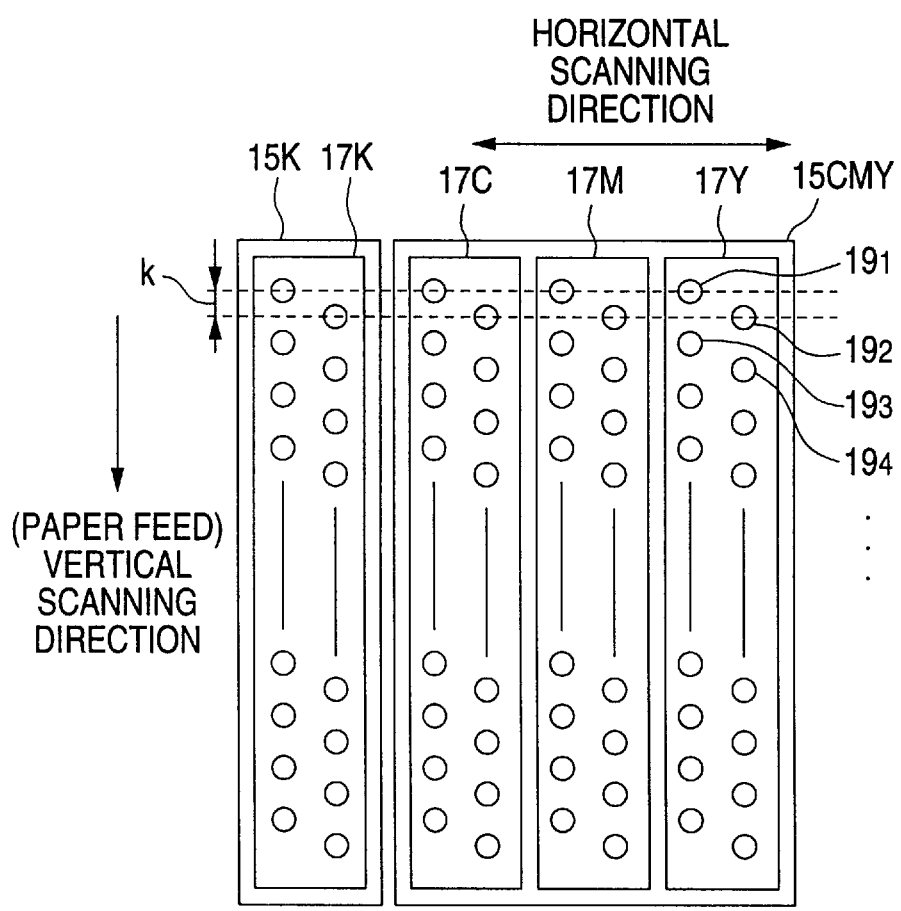
FIG. 2 shows arrays of ink jet nozzles placed on the surfaces of print heads facing paper in the embodiment of the invention.

FIG. 2 is a plan view showing arrays of ink jet nozzles placed on the surfaces of the print heads 15K and 15CMY facing the paper 1.

The print head 15K is formed with a nozzle array 17K for jetting K ink and the print head 15CMY is formed with nozzle arrays 17C, 17M, and 17Y for jetting C ink, M ink, and Y ink respectively. These four nozzle arrays 17K, 17C, 17M, and 17Y are completely matched with each other in vertical scanning direction positions and are placed in parallel in the horizontal scanning direction as a whole.

Each of the nozzle arrays 17K, 17C, 17M, and 17Y comprises a large number of ink nozzles 191, 192, ... in a staggered arrangement with a given pitch k, which will be hereinafter called the nozzle pitch k, along the vertical scanning direction as a whole.

In the configuration, a system for simply repeating horizontal scanning and vertical scanning alternately is adopted as a scanning system. That is, in unidirectional printing, while running back and forth once in the horizontal scanning direction, the print heads 15K and 15CMY are driven only on the go way for forming dots on the surface of the paper 1 and each time one running back and forth terminates, the paper 1 is fed by a given distance in the vertical scanning direction. In bidirectional printing, while running back and forth once in the horizontal scanning direction, the print heads 15K and 15CMY are driven on the both go and return ways for forming dots and each time one running on the go way or on the return way terminates, the paper 1 is fed by a given distance.

The distance of one paper feed, which will be hereinafter referred to as a vertical scanning pitch, L is set so as to satisfy the following expression (1):

$$L = N/(s \cdot D \cdot k) \qquad (1)$$

where N is the total number of nozzles possessed by one nozzle array, s is the number of horizontal scanning repetitions required for completely printing one line continuous in the horizontal scanning direction, which will be hereinafter referred to as the number of scan repetitions, s also being an arbitrarily selected integer between more than one and less than N, and k is the distance between the center points of two contiguous nozzles in the vertical scanning direction, namely, the nozzle pitch. The nozzle pitch k is represented using a multiple of the dot pitch of a print image, and the nozzle pitch k is an arbitrarily selected integer between more than one and less than N and which is not commensurable with N/s. The term "commensurable" is used here according to its mathematical definition; in other words, N/s and k should not be divisible by a common factor greater than one an integer number of times. D is a nozzle density, namely, the number of nozzles contained in one inch of the nozzle array in the vertical scanning direction. Throughout the specification, the nozzle density D is represented by npi (nozzles per inch) units and therefore the vertical scanning pitch L is represented by inches (i).

Table 1 lists the parameters in expression (1) as a specific example.

The example in Table 1 is a specific example with N=30 [nozzles] and D=180 [npi]. Four print modes "high speed," "standard," "high quality," and "very high quality" are provided and proper values assigned to the parameters are set for each mode.

The print mode "standard mode" is intended for printing in the most standard image quality and provides an image resolution (dot density on a print image) set to 360 dpi (dots per inch) as a standard value. The "high speed" mode is intended for printing at a higher speed than the standard mode and provides a resolution set to 180 dpi, a half of the resolution in the standard mode. The "high quality mode" is intended for printing in higher image quality than the standard mode and provides a resolution set to 720 dpi, twice that of the standard mode. The "very high quality mode" is intended for printing in furthermore higher image quality and provides a resolution set to 1440 dpi, four times that of the standard mode.

The meanings of the parameters listed in Table 1 are as follows: The "number of scan repetitions s" and "nozzle pitch k" have already been explained. The "vertical scanning pitch L" also has already been explained; the numeric value of each denominator under the column listed in Table 1 denotes the image resolution and the numeric value of the numerator indicates that the vertical scanning pitch L is equivalent to that number of times the dot pitch (dot pitch being the distance between contiguous dots). The "relative horizontal scanning speed" is the head running speed in each mode expressed in a relative ratio with the speed in the standard mode as 1. The "head frequency" is a clock signal frequency for driving each nozzle of the head. The "relative printing speed" is the number of pages that can be printed on paper of a given size within a given time (throughput), expressed in a relative ratio with that in the standard mode as 1. The "relative number of data pieces" is the amount of data that can be printed on paper of a given size (proportional to the square of the resolution), expressed in a relative ratio with that in the standard mode as 1.

Parameter setting and meanings in each print mode will be discussed with reference to Table 1.

In the high speed mode, number of scan repetitions s=1, nozzle pitch k=1, and vertical scanning pitch L=30/180 [i] are set. The number of scan repetitions s=1 means that the nozzles 191, 192, . . . are driven at continuous timing corresponding to all dots during horizontal scanning for completely printing a continuous line in the horizontal scanning direction by one horizontal scanning. The nozzle pitch k=1 means that the nozzle pitch equals the dot pitch, namely, the image resolution is 180 dpi equal to the nozzle density D. The vertical scanning pitch L=30/180 [i] means that the distance of one vertical scanning is equivalent to 30 (=N/s) dots of a 180-dpi image.

In the high speed mode, the most orthodox print operation is performed wherein the band area crossed by the nozzle arrays is completely printed by one horizontal scanning and upon completion of the horizontal scanning, vertical scanning is performed as wide as the band area. Therefore, special operation for image enhancement like interlace or shingling is not performed in the high speed mode.

In the standard mode, number of scan repetitions s=2, nozzle pitch k=2, and vertical scanning pitch L=15/360 [i] are set. The number of scan repetitions s=2 means that the nozzles 191, 192, . . . are driven at intermittent timing corresponding to alternate dots (1=s−1) during horizontal scanning. Therefore, the horizontal scanning needs to be repeated two (=s) times to completely print a continuous line in the horizontal scanning direction. The nozzle pitch k=2 means that the nozzle pitch is twice the dot pitch, namely, the image resolution is 360 dpi, twice the nozzle density D (=180 dpi). The vertical scanning pitch L=15/360 [i] means that the distance of one vertical scanning is equivalent to 15 (=N/s) dots of a 360-dpi image.

The specific print operation in the standard mode under such parameter setting will be discussed with reference to FIG. 3.

Figure 3:
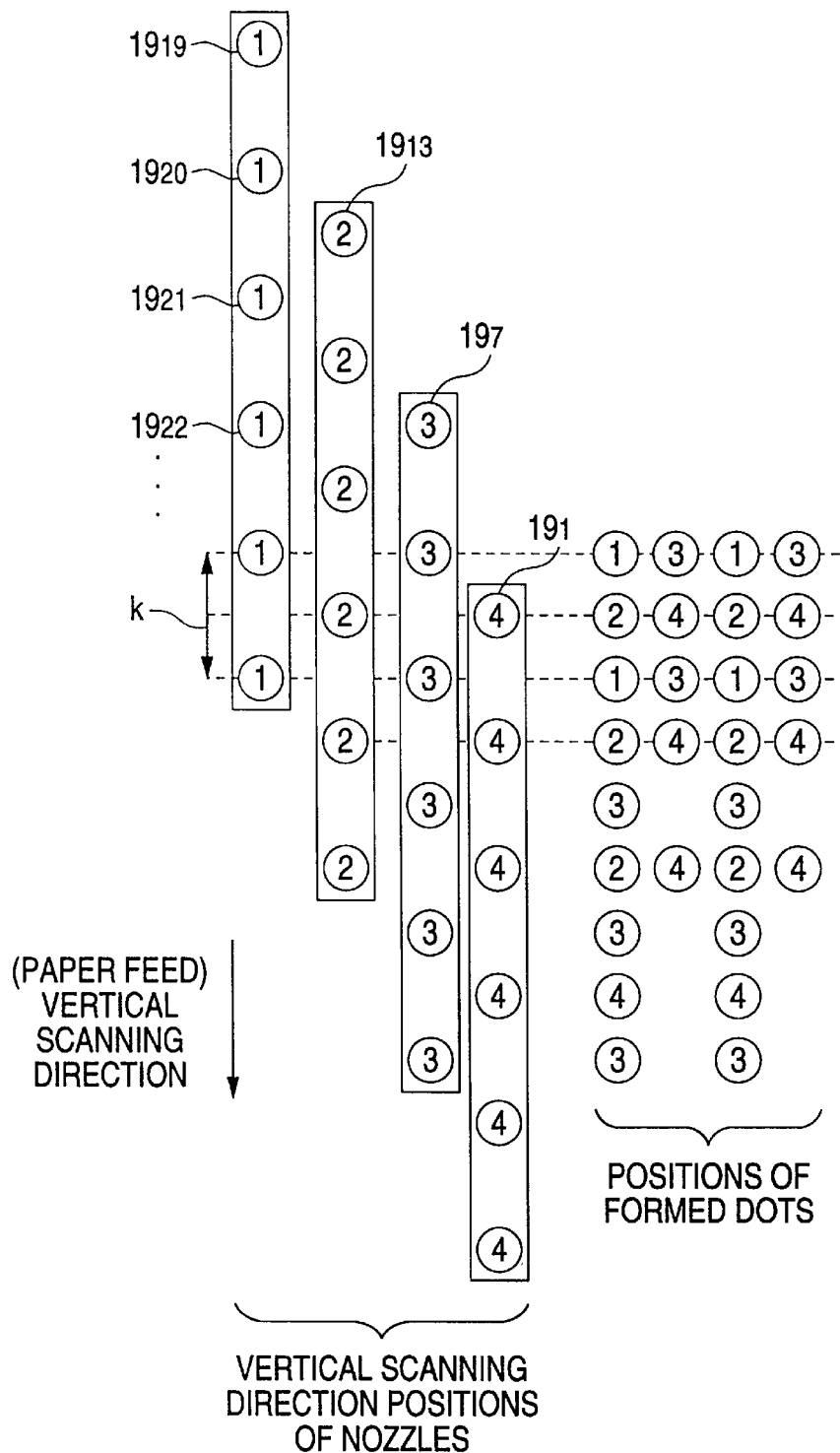
FIG. 3 shows specifically how dots are formed in standard mode.

FIG. 3 shows schematically the positions of nozzles in the vertical scanning direction within one nozzle array and the positions of dots formed by the nozzles. However, since it is difficult to illustrate all of 30 nozzles 191–1930, only some nozzles required at least for the description are extracted in FIG. 3. In the figure, the nozzle positions and dot positions denoted by the circled digits 1, 2, 3, . . . indicate the positions of the nozzles in the vertical scanning direction and the positions of the dots formed by the nozzles in the first horizontal scanning, second horizontal scanning, third horizontal scanning, . . .

As seen in FIG. 3, in the first horizontal scanning, the nozzles 191–1930 are driven intermittently at 1-dot intervals for forming dots at every other dot position marked 1. Upon completion of the first horizontal scanning, vertical scanning is performed only at the 15-dot distance, which is equivalent to the distance as long as seven nozzles plus one dot. The vertical scanning causes the nozzles 191–1930 to move to the positions marked 2, namely, the middle positions between the nozzle positions at the first horizontal scanning time. Subsequently, the second horizontal scanning is performed and the nozzles 191–1930 are driven intermittently at the same timing as the first horizontal scanning time, thereby forming new dots at the positions (2) downward contiguous in the figure to the dots at the first horizontal scanning time.

Upon completion of the second horizontal scanning, again 15-dot vertical scanning is performed, moving the nozzles 191–1930 to the positions marked 3, namely, the positions overlapping the nozzle positions in the first horizontal scanning. Subsequently, the third horizontal scanning is performed and the nozzles 191–1930 are driven intermittently at the timing provided by inverting the phase from the timing at the first, second horizontal scanning time, thereby forming new dots at the positions (3) contiguous in the horizontal scanning direction to the dot positions in the first horizontal scanning.

Upon completion of the third horizontal scanning, again 15-dot vertical scanning is performed. Subsequently, the fourth horizontal scanning is performed and the nozzles 191–1930 are driven intermittently at the same timing as the third horizontal scanning time, thereby forming new dots at the positions (4) contiguous in the horizontal scanning direction to the dot positions in the second horizontal scanning.

It is understood that the operation forms the dots by different nozzles at different horizontal scanning times within the dot matrix of two (=s) dots in the horizontal scanning direction×two (=k) dots in the vertical scanning direction.

The operation is executed with respect to one nozzle array. The four color nozzle arrays 17K, 17C, 17M, and 17Y execute the operation at different drive timings from each other. For example, in the first horizontal scanning to fourth horizontal scanning, the nozzle array 17K forms dots in the dot order of 1 to 2 to 3 to 4 in FIG. 3; the nozzle array 17C forms dots in the dot order of 2 to 3 to 4 to 1; the nozzle array 17M forms dots in the dot order of 3 to 4 to 1 to 2; and the nozzle array 17Y forms dots in the dot order of 4 to 1 to 2 to 3. Thus, four-color dots are formed so that they do not overlap at the same positions in the same horizontal scanning. Further, it may be considered to adopt such a configulation of a print head that the print head 15CMY in FIG. 2 is shifted to the vertical scanning direction at the width of the half nozzle pitch (=k/2). In this case, dots in two types of ink (K and CMY color inks) can always be formed separately at diagonal positions.

Returning to Table 1, the high quality mode will be discussed.

In the high quality mode, number of scan repetitions s=2, nozzle pitch k=4, vertical scanning pitch L=15/720 [i], and relative horizontal scanning speed=2 are set. Since the number of scan repetitions s=2, the nozzles 191, 192, . . . are driven at intermittent timing corresponding to alternate dots as in the standard mode described above. The nozzle pitch k=4 means that the nozzle pitch is four times the dot pitch, namely, the image resolution is 720 dpi, four times the nozzle density D (=180 dpi). The vertical scanning pitch L=15/720 [i] means that the distance of one vertical scanning is equivalent to 15 (=N/s) dots of a 720-dpi image. The relative horizontal scanning speed=2 means that the head runs at the speed twice that in the standard mode.

The specific print operation in the high quality mode under the parameter setting will be discussed with reference to FIG. 4.

Figure 4:
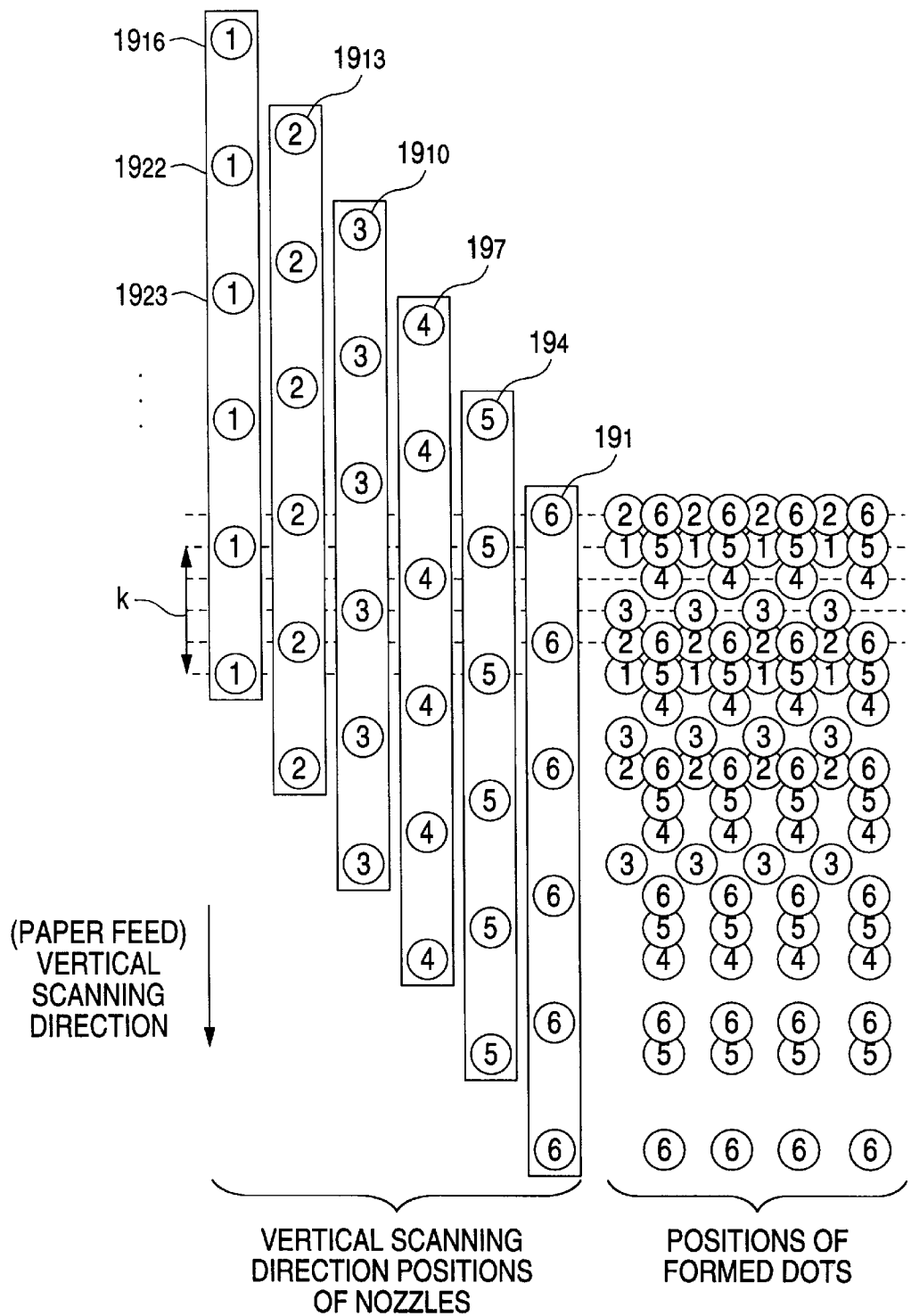
FIG. 4 shows specifically how dots are formed in high quality mode.

FIG. 4 also shows schematically the positions of nozzles in the vertical scanning direction and the positions of dots formed by the nozzles, wherein some nozzles required for the description are extracted from one nozzle array, as in FIG. 3. The nozzle positions and dot positions denoted by the circled digits 1, 2, 3, . . . indicate the positions of the nozzles in the vertical scanning direction and the positions of the dots formed by the nozzles in the first horizontal scanning, second horizontal scanning, third horizontal scanning, . . .

As shown in FIG. 4, in the first horizontal scanning, the nozzles 191–1930 are driven intermittently every other dot for forming dots at dot positions marked 1. Upon completion of the first horizontal scanning, vertical scanning is performed only at the 15-dot distance, which is equivalent to the distance as long as three nozzles plus three dots. The vertical scanning causes the nozzles 191–1930 to move to the positions marked 2, namely, the positions shifted one dot upward in the figure from the nozzle positions at the first horizontal scanning time. Subsequently, the second horizontal scanning is performed and the nozzles 191–1930 are driven at the same intermittent timing as the first horizontal scanning time, thereby forming new dots at the dot positions (2) upward contiguous to the dots at the first horizontal scanning time.

Upon completion of the second horizontal scanning, again 15-dot vertical scanning is performed, moving the nozzles 191–1930 to the positions marked 3, namely, the positions shifted one dot upward from the nozzle positions in the second horizontal scanning. Subsequently, the third horizontal scanning is performed and the nozzles 191–1930 are driven at the same timing as the first, second horizontal scanning time, thereby forming new dots at the dot positions (3) upward contiguous to the dots in the second horizontal scanning.

Subsequently, 15-dot vertical scanning is performed, moving the nozzles 191–1930 to the positions shifted one dot upward from the nozzle positions in the third horizontal scanning, namely, the positions shifted one dot downward from the nozzle positions in the first horizontal scanning. The fourth horizontal scanning is performed and the nozzles 191–1930 are driven at the intermittent timing provided by inverting the phase from the drive timing at the third horizontal scanning time, thereby forming new dots at the dot positions (4) contiguous in the lower right slant direction in the figure to the dot positions in the first horizontal scanning.

The subsequent vertical scanning causes the nozzles 191–1930 to move to the positions overlapping the positions at the first horizontal scanning time. The fifth horizontal scanning is performed and the nozzles 191–1930 are driven at the same timing as the fourth horizontal scanning time, thereby forming new dots at the dot positions (5) contiguous in the horizontal scanning direction to the dots in the first horizontal scanning.

In the sixth horizontal scanning, the nozzles 191–1930 are driven at the same timing as the fourth, fifth horizontal scanning time, thereby forming new dots at the dot positions (6) contiguous in the horizontal scanning direction to the dots in the second horizontal scanning. Then, although not shown in the figure, in the seventh horizontal scanning, new dots are formed at the dot positions contiguous in the horizontal scanning direction to the dots at the third horizontal scanning time, and in the eighth horizontal scanning, new dots are formed at the dot positions contiguous in the horizontal scanning direction to the dot positions at the fourth horizontal scanning time.

It is understood that the operation forms the dots by different nozzles at different horizontal scanning times within the dot matrix of two (=s) dots in the horizontal scanning direction×four (=k) dots in the vertical scanning direction.

The operation is executed with respect to one nozzle array. The four color nozzle arrays 17K, 17C, 17M, and 17Y execute the operation at drive timings out of phase each other. As a result, four-color dots are formed at different positions and dots of different colors are not formed overlapping at the same positions in the same horizontal scanning.

Returning to Table 1, the very high quality mode will be discussed.

In the very high quality mode, number of scan repetitions s=4, nozzle pitch k=8, vertical scanning pitch L=7/1440 [i], and relative horizontal scanning speed=4 are set. The mode uses only continuous 28 nozzles of 30 nozzles in each nozzle array. The number of scan repetitions s=4 means that the nozzles 191, 192, . . . are driven at intermittent timing corresponding to every four dots for completely printing a line continuous in the horizontal scanning direction by executing horizontal scanning four times. The nozzle pitch k=8 means that the nozzle pitch is eight times the dot pitch, namely, the image resolution is 1440 dpi, eight times the nozzle density D. The vertical scanning pitch L=7/1440 [i] means that the distance of one vertical scanning is equivalent to seven (=N/s) dots of a 1440-dpi image. The relative horizontal scanning speed=4 means that the head runs at the speed four times that in the standard mode.

Although the print operation in the very high quality mode is not illustrated, from the operation in the standard mode and the high quality mode shown in FIGS. 3 and 4, it is understood that dots are formed by different nozzles at different horizontal scanning times within the dot matrix of four (=s) dots in the horizontal scanning direction×eight (=k) dots in the vertical scanning direction in the very high quality mode.

The four color nozzle arrays 17K, 17C, 17M, and 17Y operate at drive timings out of phase with each other for forming four-color dots at different positions in the same horizontal scanning.

As seen from the description of the standard mode, the high quality mode, and the very high quality mode, according to the invention, the number of scan repetitions s and the nozzle pitch k are set each to a value of 2 or more, whereby novel print operation into which the conventional interlace system and shingling are harmoniously integrated can be performed under the scanning system for simply repeating horizontal scanning and vertical scanning.

In the novel print operation, when attention is focused on the operation of one color nozzle array, dots in the dot matrix of s dots in the horizontal scanning direction s×k dots in the vertical scanning direction are formed by different nozzles at different horizontal scanning times, whereby variations in spout characteristics of the nozzles, etc., can be dispersed, leading to image enhancement. The larger the values of s and k, the more remarkable is the image enhancement effect. In this connection, the conventional interlace system can disperse the nozzle spout characteristics, etc., only in the horizontal scanning direction and, unlike the present embodiment, cannot disperse the variations in the vertical scanning direction.

When attention is focused on the mutual operation relationships among the different color nozzle arrays, it is seen that dots of different colors are formed at different dot positions in the s×k dot matrix in the same horizontal scanning by shifting the drive timing phase of each nozzle array. Therefore, dots of different colors are not formed overlapping at the same positions in the same horizontal scanning. Particularly when s=2 or more and k=2 or more are set, all dots of four colors K, C, M, and Y normally used for color printing can be formed at different positions, so that ink bleeding among the four colors can be well prevented. This also means that it becomes possible that slow osmotic ink can be used for all four colors. If so, an image high in concentration and chroma can be printed as compared with the case where very osmotic ink is used, thus further image enhancement can be expected. In this connection, if an attempt is made to form dots of four colors at different positions in the conventional shingling, the number of scan repetitions must be set to four or more. In doing so, the throughput falls to a half or less of that with s=2 (standard mode, high quality mode) in the embodiment.

For example, if slow osmotic ink is used for K ink and very osmotic ink is used for CMY color ink, it is desirable to prevent slow osmotic K ink and very osmotic color ink from overlapping in the same horizontal scanning. Then, for example, it is considered to adopt such a configuration that the print head 15CMY in FIG. 2 is shifted to the vertical scanning direction at the width of the half nozzle pitch (=k/2). When such a print head is driven, dots in two types of ink can always be formed separately at diagonal positions in such a manner that K ink dots are formed at the dot positions marked 1 and color ink dots are formed at the dot positions marked 4 in the first horizontal scanning, that K ink dots are formed at the dot positions marked 2 and color ink dots are formed at the dot positions marked 3 in the second horizontal scanning, and that K ink dots are formed at the dot positions marked 3 and color ink dots are formed at the dot positions marked 2 in the third horizontal scanning. In doing so, ink bleeding can be furthermore prevented because dots of two types are more spaced from each other as compared with the case where dots of two types are formed at contiguous positions in the horizontal or vertical scanning direction. In this connection, if an attempt is made to provide a similar function in the conventional shingling, again the number of scan repetitions must be set to four or more and therefore the throughput becomes lower than that in the standard mode.

Further, dots of four colors can also be formed at positions not contiguous to each other in the same horizontal scanning by setting s or k to a furthermore larger value. For example, since s=4 and k=8 are set in the very high quality mode, dots of four colors can be formed at different dot positions in a 4×8 dot matrix in the same horizontal scanning. Thus, the dots of four colors can be formed at positions two dots or more distant from each other. Moreover, the time at which dots of different colors are formed at the same position can be made to correspond to twice or more horizontal scannings. Therefore, ink bleeding can be prevented completely.

In the embodiment, since the horizontal scanning speed is increased with an increase in the number of scan repetitions s and the resolution, for example, from the standard mode to the very high quality mode, the is lowered less as the number of scan repetitions s and the resolution increase.

By the way, unidirectional or bidirectional printing can be selected, as described above. In the unidirectional printing, the head is driven for forming dots only for the time when it runs on the go way. In the bidirectional printing, the head is driven for forming dots for the time when it runs on both the go and return ways. Therefore, the bidirectional printing provides throughput near twice that of the unidirectional printing; there is a possibility that dot formation positions will slightly shift between the go and return ways, degrading the image quality. This is caused by the fact that the ink jet speed from the ink jet head or the wire expanding speed from the wire impact head is finite. To solve the problem, a correction for making the head drive timing slightly different between go and return ways can be made by a controller; nevertheless, it is difficult to completely solve the problem. There is a possibility that the problem on the bidirectional printing will become remarkable particularly when one line in the horizontal scanning direction is printed separately on go and return ways. For example, in FIG. 3, if dots marked 1 are printed on the go way and dots marked 3 are printed on the return way, there is a possibility that the dot formation position shift between the go and return ways will cause spacing between the dots marked 1 and the dots marked 3 to become inconstant, degrading the image quality.

To make the bidirectional printing problem as unremarkable as possible, it is desirable to always print one line in the horizontal scanning direction only on either the go or return way in the print operation of the invention. For example, when bidirectional printing is executed in the standard mode shown in FIG. 3, the dots marked odd digits are printed on the go way and the dots marked even digits are printed on the return way, so that one line is always printed only on either the go or return way. The same also applies to the high quality mode shown in FIG. 4. The condition required for always printing one line only on either the go or return way is to set both the number of scan repetitions s and the nozzle pitch k to even numbers.

Figure 5:
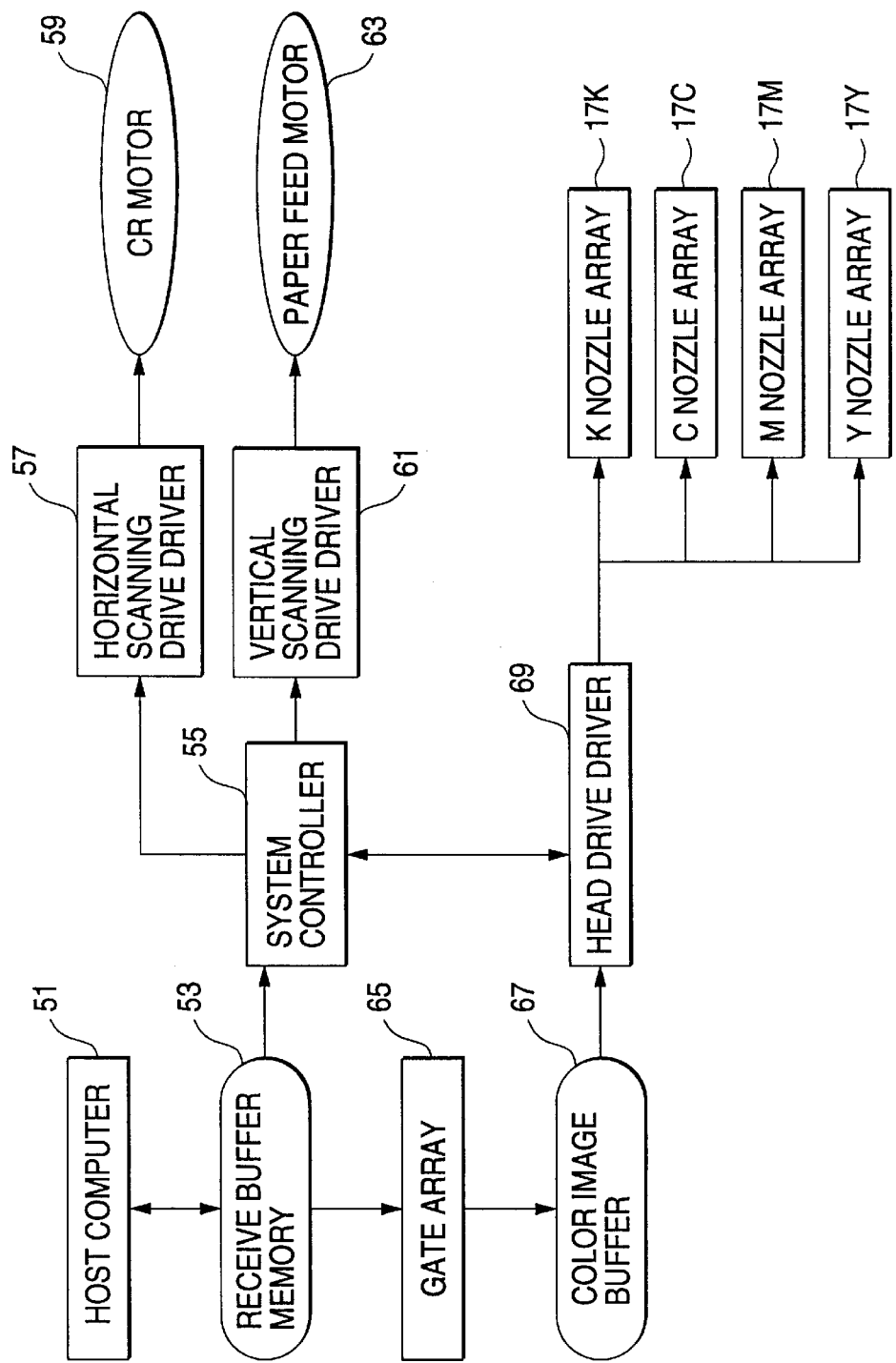
FIG. 5 shows the configuration of a control circuit of the embodiment.

FIG. 5 shows the configuration of a printer control circuit for performing the print operation.

In FIG. 5, a printer driver of an external host computer 51 determines parameter values as listed in Table 1 based on the print mode specified by the user, generates print data appropriate for printing in the print mode based on the parameter values, and transfers the print data to the printer. The transferred data is once stored in a receive buffer memory 53.

In the printer, a system controller 55 reads the print data from the receive buffer memory 53 and sends a control signal to a horizontal scanning drive driver 57, a vertical scanning drive driver 61, and a head drive driver 69 based on the print data.

A gate array 65 reads the print data from the receive buffer memory 53, generates K, C, M, and Y color image data based on the print data, and writes the image data into a color image buffer 67. The head drive driver 69 reads the color image data from the image buffer 67 and drives color nozzle arrays 17K, 17C, 17M, and 17Y in response to the control signal from the system controller 55.

The horizontal scanning drive driver 57 and the vertical scanning drive driver 61 drive a carriage motor 59 and a paper feed motor 63 respectively in response to the control signal from the system controller 55.

Figure 6:
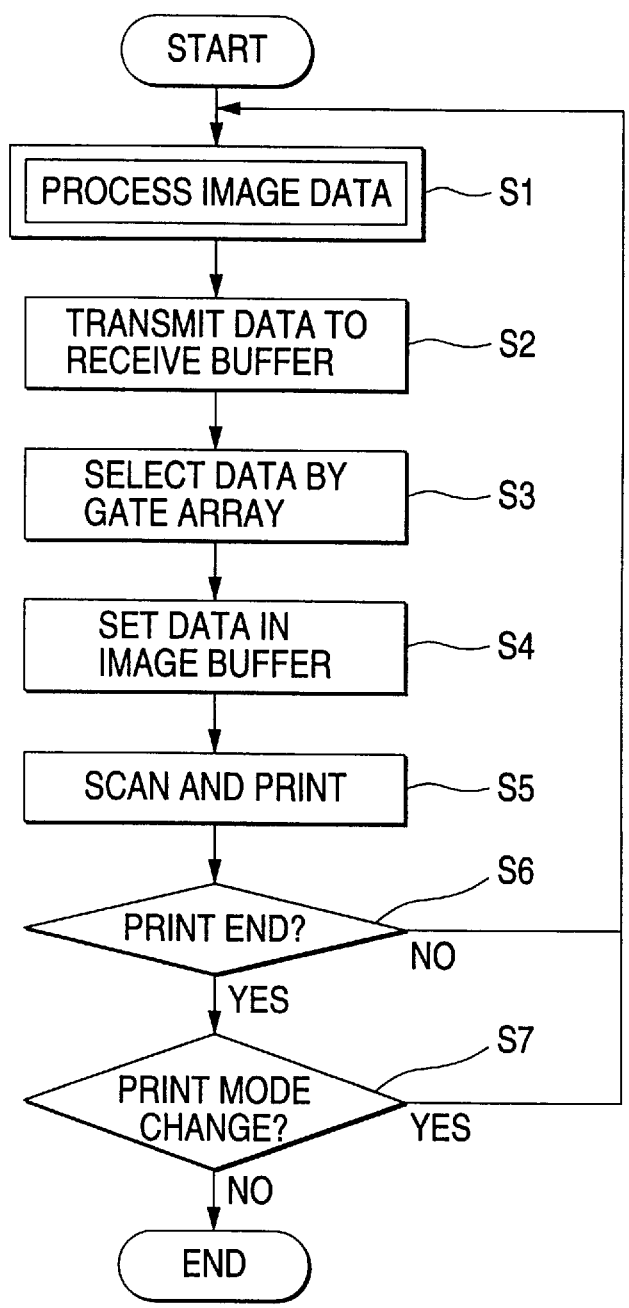
FIG. 6 is a flowchart showing a flow of the entire operation of the control circuit of the embodiment.

FIG. 6 shows a flow of the entire operation according to the configuration in FIG. 5.

First, the printer driver in the host computer 51 processes image data in accordance with the print mode specified by the user at step S1 and transfers the print data of the processing result to the receive buffer memory 53 in the printer at step S2. In the printer, the gate array 65 reads the print data from the receive buffer 53 at step S53, generates K, C, M, and Y color image data for printing based on the print data, and writes the image data into the image buffer 67 at step S4. Next, the carriage motor 59, the paper feed motor 63, and the color nozzle arrays 17K, 17C, 17M, and 17Y are driven for printing under the control of the system controller 55 at step S5.

The operation is repeated until the printing is complete. Upon completion of the printing at step S6, the host computer 51 checks whether or not print mode change is input by the user at step S7 and if no change is input, terminates the above process and if change is input, again executes the process in a new print mode.

Figure 7:
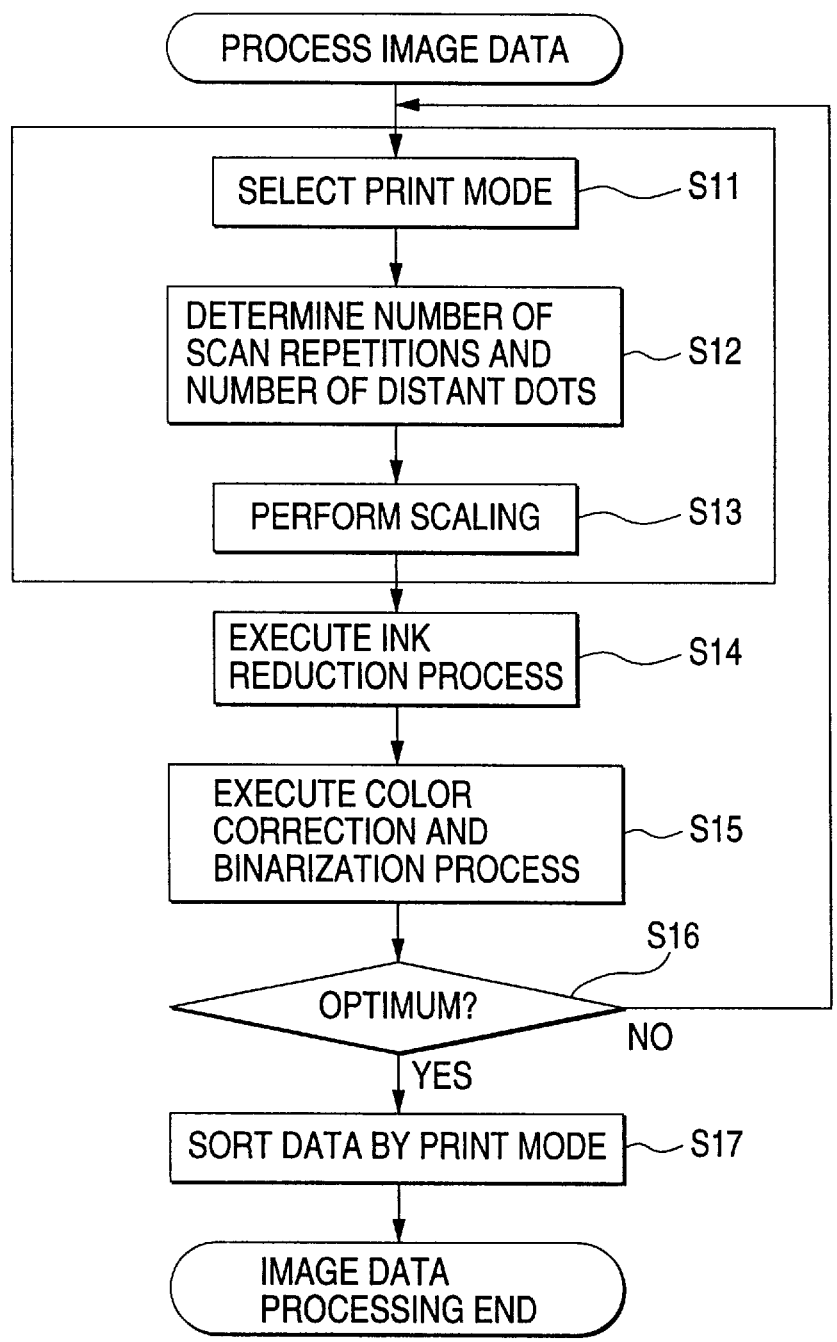
FIG. 7 shows a flow of image data processing by a printer driver in a host computer.

FIG. 7 shows a flow of the image data processing (FIG. 6, S1) by the printer driver in the host computer 51.

First, print mode selection is accepted from the user at step S11 and the parameter values of the number of scan repetitions s, the nozzle pitch k, etc., listed in Table 1 are determined in response to the selected print mode at step S12. Next, scaling is performed, namely, the original image data generated by an application is converted into image data of the resolution corresponding to the selected print mode at step S13.

Next, an ink reduction process is executed, namely, a duty restriction is placed on the image data based on the ink acceptance amount limit on paper in response to the type of print paper selected by the user at step S14. Next, color correction and binarization process are performed on the image data (generally, 256 gray levels for each color in RGB representation) for conversion to binary data in CMY representation at step S15.

Next, whether or not the resultant image data is optimum is checked at step S16. If the image data is not optimum, the processing is again performed starting at the print mode selection at step S11; if the image data is optimum, the image data is sorted so as to match the color dot formation order corresponding to the print mode at step S17 and the image data processing is terminated.

Figure 8:
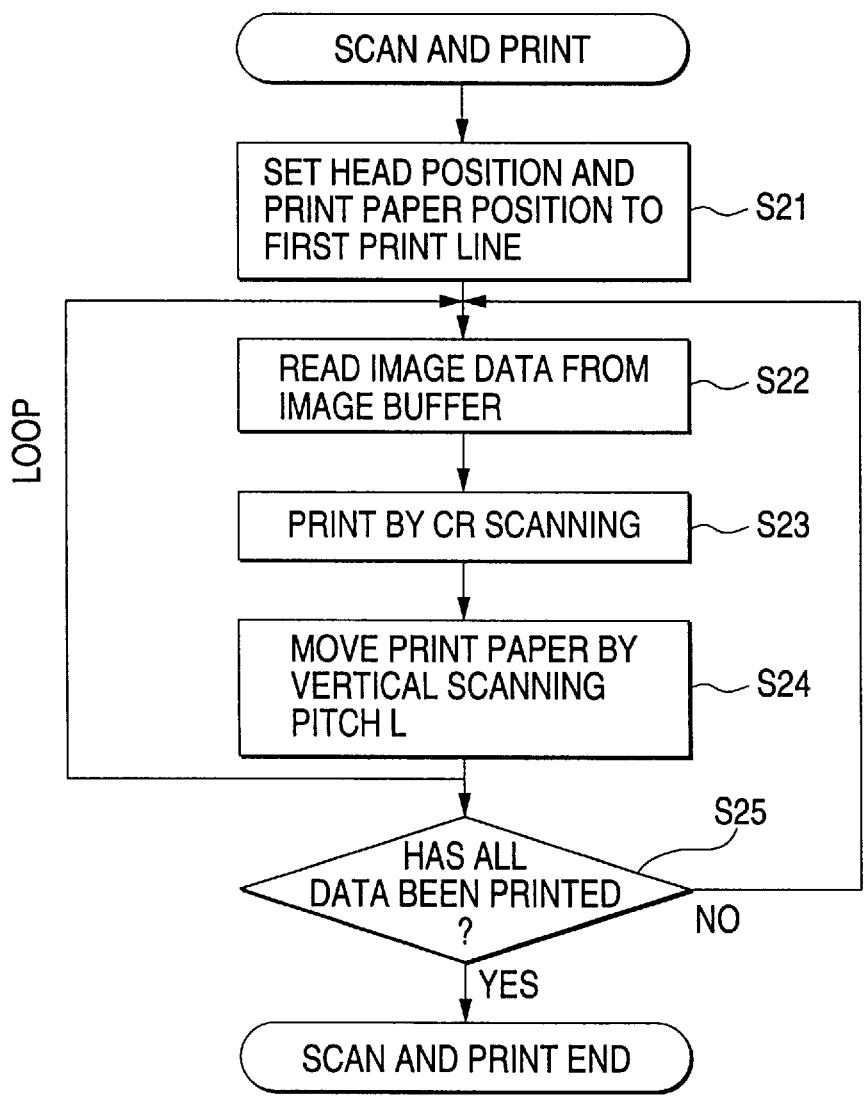
FIG. 8 shows a flow of scanning and printing performed under the control of the system controller.

FIG. 8 shows a flow of scanning and printing (FIG. 6, S5) performed under the control of the system controller 55.

First, the print head and print paper are aligned so that printing can be started on the first print line at step S21. Next, the color image data is read from the image buffer 67 at step S22 and while the carriage is being run, the color nozzles are driven for printing in response to the image data at step S23. At the termination of horizontal scanning, the print paper is moved by vertical scanning pitch L at step S24. Steps 22 to 24 are repeated until printing of one page is complete.

The process is repeated until printing of all pages is complete. Upon completion at step S25, the scanning and printing process is terminated.

Although we have discussed one preferred embodiment of the invention, the invention can also be embodied in various forms in addition to the embodiment. For example, the invention can be applied not only to color printing, but also to monochrome printing. It can also be applied to printing representing multiple tone images by representing one pixel by a plurality of dots. It can also be applied to drum scan printers. In the drum scan printer, the drum rotation direction is the horizontal scanning direction and the carriage running direction is the vertical scanning direction.

TABLE 1

| Print mode | Image solution (dpi) | No. of scan repetitions s | Nozzle pitch k | Vertical pitch L(i) | Relative horizontal scanning speed | Head frequency (kHz) | Relative printing speed | Relative number of data pieces |
|---|---|---|---|---|---|---|---|---|
| High speed | 180 × 180 | 1 | 1 | 30/180 | 1 | 3.6 | 4 | 1/4 |
| Standard | 360 × 360 | 2 | 2 | 15/360 | 1 | 3.6 | 1 | 1 |
| High quality | 720 × 720 | 2 | 4 | 15/720 | 2 | 7.2 | 1/2 | 4 |
| Very high quality | 1440 × 1440 | 4 | 8 | 7/1440 | 4 | 7.2 | 1/4 | 16 |

What is claimed is:

1. An apparatus in which a print head thereof executes a horizontal scanning and a vertical scanning on a surface of a print medium for printing the surface of the print medium, the apparatus comprising:

a dot formation element array having N dot formation elements for forming dots of a single color, N being a finite, positive integer treater than one, said dot formation elements being arranged on a surface of the print head and facing the print medium at a constant pitch in the vertical scanning direction;

horizontal scanning drive means for executing the horizontal scanning of the print head;

head drive means for driving said dot formation element array during the horizontal scanning; and vertical scanning drive means for executing the vertical scanning of the print head by a predetermined distance L each time the horizontal scanning terminates;

wherein the following conditions are satisfied:

s is an arbitrary integer greater than one and less than N, k is an arbitrary integer greater than one and less than N and which is not commensurable with N/s, and $$L = N/(s \cdot D \cdot k);$$

wherein L is a vertical scanning pitch which is the predetermined distance of one vertical scanning, s is the number of scan repetitions which is the number of horizontal scanning repetitions required for printing a line continuous in a horizontal scanning direction, k is an element pitch which is a value representing a vertical distance between center points of contiguous ones of the dot formation elements, expressed as a multiple of a dot pitch of a print image, and D is an element density which is the number of the dot formation elements existing per unit of vertical distance in said dot formation element array.

2. The printer as claimed in claim 1, further comprising print mode selection means for selecting one of a plurality of print modes which differ in at least one of the number of scan repetitions s and the element pitch k.

3. The printer as claimed in claim 2, wherein said horizontal scanning drive means is responsive to the number of scan repetitions s in the print mode selected by said print mode selection means for changing a horizontal scanning speed in such a manner that the greater the number of scan repetitions s, the faster is the horizontal scanning speed.

4. The printer as claimed in claim 1, wherein said head drive means drives said dot formation element array at intermittent timing corresponding to dots at intervals of (s−1) dots during the horizontal scanning.

5. The printer as claimed in claim 4, wherein said head drive means drives said dot formation element array so that different dots in a dot matrix having s dots in the horizontal scanning direction and k dots in the vertical scanning direction are formed by repeating the horizontal scanning s×k successive times.

6. The printer as claimed in claim 1, wherein the apparatus comprises a plurality of dot formation element arrays for forming dots of different colors, and said head drive means drives said plurality of dot formation element arrays at different timings so that dots of different colors are formed at different dot positions during the horizontal scanning.

7. The printer as claimed in claim 1, wherein said head drive means drives said dot formation element array for both a forward direction and a reverse direction of the horizontal scanning, said vertical scanning drive means performs the vertical scanning by a predetermined distance each time each of the forward direction horizontal scanning and the reverse direction horizontal scanning terminates, and both the number of scan repetitions s and the element pitch k are set to even numbers.

8. A method of printing on a surface of a print medium with a print head having a dot formation element array including N dot formation elements for forming dots of a single color arranged at a constant pitch in a vertical scanning direction, where N is a finite, positive integer greater than one, the method comprising the steps of:

executing horizontal scanning of the print head;

driving said dot formation element array during the horizontal scanning;

executing vertical scanning of the print head by a predetermined distance L each time the horizontal scanning terminates;

selecting s which is an arbitrary integer greater than one and less than N;

selecting k which is an arbitrary integer treater than one and less than N and which is not commensurable with N/s; and selecting L which satisfies the following equation, $$L = N/(s \cdot D \cdot k);$$

wherein L is a vertical scanning pitch which is the predetermined distance of one vertical scanning, s is the number of scan repetitions which is the number of horizontal scanning repetitions required for printing a line continuous in a horizontal scanning direction, k is an element pitch which is a value representing a vertical distance between center points of contiguous ones of the dot formation elements, expressed as a multiple of a dot pitch of a print image, and D is an element density which is the number of the dot formation elements existing per unit of vertical distance in said dot formation element array.

9. The method as claimed in claim 8, further comprising a step of selecting any one of a plurality of provided print modes, wherein said step of selecting the number of scan repetitions s includes a step of selecting a first value responsive to the selected print mode as the number of scan repetitions s, and said step of selecting the element pitch k includes a step of selecting a second value responsive to the selected print mode as the element pitch k.

10. The method as claimed in claim 9, wherein said step of executing the horizontal scanning includes a step of changing a horizontal scanning speed in such a manner that the greater the first value, the faster is the horizontal scanning speed in response to the first value selected.

11. The method as claimed in claim 8, wherein said step of driving said dot formation element array includes a step of driving said dot formation element array at intermittent timing corresponding to dots at intervals of (s−1) dots during the horizontal scanning.

12. The method as claimed in claim 11, wherein said step of driving said dot formation element array includes a step of driving said dot formation element array so that different dots in a dot matrix having s dots in the horizontal scanning direction and k dots in the vertical scanning direction are formed by repeating the horizontal scanning s×k successive times.

13. The method as claimed in claim 8, wherein said step of driving said dot formation element array comprises driving a plurality of dot formation element arrays for forming dots of different colors at different timings so that dots of different colors are formed at different dot positions.

14. The method as claimed in claim 8, wherein said step of driving said dot formation element array includes a step of driving said dot formation element array for both a forward direction and a reverse direction of the horizontal scanning, said step of executing the vertical scanning includes performing the vertical scanning by a given distance each time each of the forward direction horizontal scanning and the reverse direction horizontal scanning terminates, wherein said step of selecting the number of scan repetitions s includes a step of setting a first even number as the number of scan repetitions and said step of selecting the element pitch k includes a step of setting a second even number as the element pitch k.

* * * * *